United States Patent
King (10) Patent No.: US 8,560,811 B2
(45) Date of Patent: Oct. 15, 2013

(54) LANE CROSSING INSTRUCTION SELECTING OPERAND DATA BITS CONVEYED FROM REGISTER VIA DIRECT PATH AND LANE CROSSING PATH FOR EXECUTION

(75) Inventor: John M. King, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 449 days.

(21) Appl. No.: 12/850,959

(22) Filed: Aug. 5, 2010

(65) Prior Publication Data

US 2012/0036342 A1 Feb. 9, 2012

(51) Int. Cl.
*G06F 9/30* (2006.01)

(52) U.S. Cl.
USPC .......................................... 712/210; 712/221

(58) Field of Classification Search
None
See application file for complete search history.

(56) References Cited

U.S. PATENT DOCUMENTS 7,085,966 B2 * 8/2006 Luick ............................. 714/43

* cited by examiner

*Primary Examiner* — Kenneth S Kim (57) ABSTRACT

The present invention provides a method and apparatus for handling lane-crossing instructions in an execution pipeline. One embodiment of the method includes conveying bits of an instruction from a register to an execution stage in a pipeline along a first data path that includes a lane crossing stage configured to change a first mapping of the register to the execution stage to a second mapping. The method also includes concurrently conveying the bits along a second data path from the register to the execution stage that bypasses the lane crossing stage. The method further includes selecting the first or second data path to provide the bits to the execution stage.

24 Claims, 9 Drawing Sheets

LANE CROSSING INSTRUCTION SELECTING OPERAND DATA BITS CONVEYED FROM REGISTER VIA DIRECT PATH AND LANE CROSSING PATH FOR EXECUTION

BACKGROUND OF THE INVENTION

1. Field of the Invention

This invention relates generally to processor-based systems, and, more particularly, to handling lane crossing instructions for an execution pipeline in a processor-based system.

2. Description of the Related Art

Processors are typically designed using a pipeline architecture that divides the processing of each computer instruction into a series of independent steps. For example, a processor pipeline can be divided into an instruction fetch stage during which instructions are retrieved from memories or caches, an instruction decode stage in which the instructions are decoded, an execution stage in which the decoded instructions are executed, and a write-back stage in which the information generated during execution is written back into memory. Each stage is typically separated by a set of flip flops or registers for storing the output of the stage so that it can be used as input to the next stage during a subsequent clock cycle. Pipelining can improve the efficiency of processors significantly but it requires a high degree of coordination because each stage is typically operating on a different instruction during each clock cycle. Sequential instructions are therefore being processed concurrently. Stalls, branch delays, timing errors, and the like can all disrupt a pipelined architecture and reduce its efficiency.

Instructions that have been decoded (e.g., in the instruction decode stage) are typically stored in a bank of registers before being provided to the execution stage in the next cycle. Execution units within the execution stage can be divided or partitioned into different units. For example, in pipelined systems that handle 128 bit operands or instructions, the execution stage can be partitioned into a low execution unit that handles 64 of the instruction bits and a high execution unit that handles the other 64 bits in the instruction. The low execution unit typically handles the 64 least significant bits and the high execution unit typically handles the 64 most significant bits in the register. However, in some classes of instructions, mapping of the register locations to the execution stage inputs may be different than this default mapping. For example, in some cases the 64 least significant bits are swapped so that they are handled by the high execution unit and the 64 most significant bits are handled by the low execution unit. These instructions are referred to as "lane crossing" instructions. Other types of swapping and/or shuffling of the instruction bits can also be performed for different types of instructions. For example, sometimes two 32 bit chunks of data within a 64 bit portion of a source instruction are swapped. For another example, in a two-source instruction, 64*b* of data from one source ca be swapped with 64 bits from the other source before proceeding to the execution units.

Additional logic is needed to detect and perform the lane crossing and/or swapping on an instruction-by-instruction basis. Lane crossing and/or swapping the source data to the appropriate execution units therefore puts timing pressure on the pipeline. One possible solution is to insert an additional pipeline stage between the instruction decode stage and the execution stage. The additional pipeline stage is responsible for performing the appropriate lane crossing and/or swapping when needed for particular instructions. However, the additional stage adds one cycle of latency to all operations, which is detrimental to those operations that do not need the lane crossing stage. The majority of 128 bit instructions do not require the lane-crossing stage and so the majority of the additional latency introduced by the lane crossing stage is unnecessary.

SUMMARY OF EMBODIMENTS OF THE INVENTION

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided that includes conveying bits of an instruction from a register to an execution stage in a pipeline along a first data path that includes a lane crossing stage configured to change a first mapping of the register to the execution stage to a second mapping. The method also includes concurrently conveying the bits along a second data path from the register to the execution stage that bypasses the lane crossing stage. The method further includes selecting the first or second data path to provide the bits to the execution stage.

In another embodiment, an apparatus is provided that includes a lane crossing stage configured to receive bits of an instruction from at least one register and convey the bits to an execution stage in a pipeline along a first data path. The lane crossing stage is further configured to change a first mapping of the register to the execution stage to a second mapping. The apparatus also includes a multiplexer configured to selectively provide the bits from the lane crossing stage according to the second mapping or to provide the bits received along a second data path from the register to the execution stage that bypasses the lane crossing stage.

In yet another embodiment, a computer readable medium having encoded instructions thereon is provided. The encoded instructions when executed cause a processor to convey bits of an instruction from a register to an execution stage in a pipeline along a first data path that includes a lane crossing stage configured to change a first mapping of the register to the execution stage to a second mapping. The encoded instructions when executed also cause the processor to concurrently convey the bits along a second data path from the register to the execution stage that bypasses the lane crossing stage. The encoded instructions when executed further cause the processor to select the first or second data path to provide the bits to the execution stage.

BRIEF DESCRIPTION OF THE DRAWINGS

The disclosed subject matter may be understood by reference to the following description taken in conjunction with the accompanying drawings, in which like reference numerals identify like elements, and in which.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 1A:
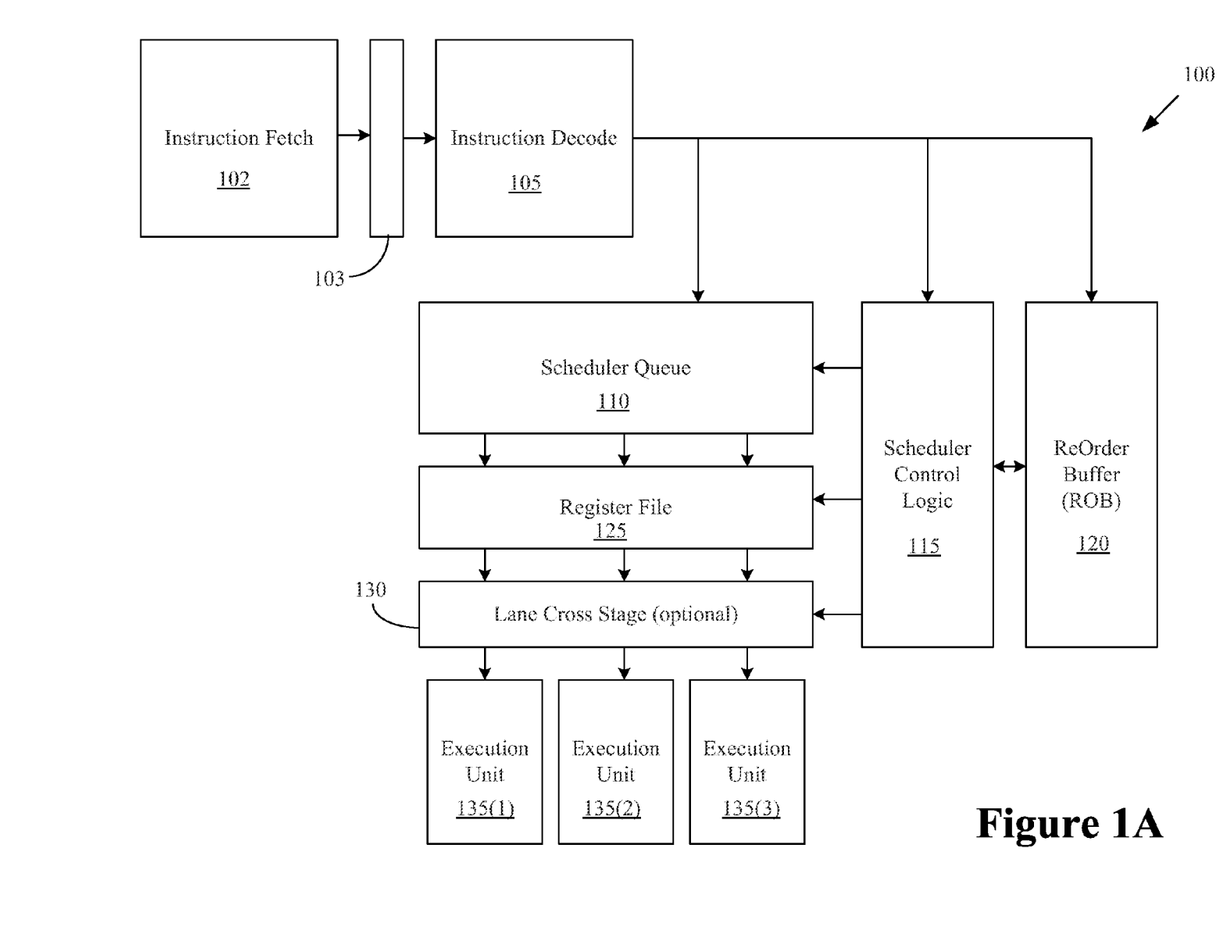
FIGS. 1A and 1B conceptually illustrate exemplary embodiments of a processor system.

FIG. 1A conceptually illustrates a first exemplary embodiment of a processor system 100. In the illustrated embodiment, the processor system 100 is a pipelined processor system divided into several stages so that each stage can perform a different set of operations on the pipelined instruction data associated with different instructions during each operational cycle of the pipeline. Techniques for implementing and operating pipelined processors are known in the art and in the interest of clarity only those aspects of implementing and operating the pipelined processor system 100 that are relevant to the claimed subject matter will be discussed in detail herein. In the illustrated embodiment, the processor system 100 includes an instruction fetch stage 102 that can fetch instructions from one or more memory locations, e.g., a main memory, and/or a cache memory such as an L1 cache or an L2 that may be implemented in the processor system 100. The fetch instructions can then be provided to one or more registers 103 before being provided to an instruction decode stage 105 in a subsequent cycle. The instruction decode stage 105 receives data bits associated with instructions that have been fetched and stored in the registers 103. The instruction decode stage 105 decodes the received instruction bits to form an instruction, such as 128-bit operands that make up a 256-bit instruction.

Information including the instructions generated by the instruction decode stage 105 can be provided to a scheduler queue 110, scheduler control logic 115, and a re-order buffer 120. For example, data bits corresponding to the decoded instruction can be provided to the scheduler queue 110 at the end of each cycle. The scheduler control logic 115 is configured to use information provided by the instruction decode stage 105 to perform operations including, but not limited to, instructing a scheduler queue 110 to issue an instruction, determining whether instructions in the scheduler queue 110 are lane-crossing instructions or non-lane-crossing instructions, and determining whether the order of the instructions should be altered or modified. The re-order buffer 120 may be used to buffer instructions during the re-ordering process. Instructions that are issued by the scheduler queue 110 are provided to a register file 125 for provision to other stages during subsequent cycles.

In the illustrated embodiment, the instruction bits in the register 125 may be optionally provided to a lane-crossing stage 130 or the instruction bits may bypass the lane-crossing stage 130. For example, the scheduler control logic 115 can provide selection signals that lane-crossing instructions are provided to the lane crossing stage 130 and non-lane-crossing instructions bypassed the lane crossing stage 130. Following the lane-crossing stage 130 the pipeline includes one or more execution units 135. Although three execution units 135 are depicted in FIG. 1A, persons of ordinary skill in the art having benefit of the present disclosure should appreciate that any number of execution units 135 (which may operate concurrently and/or in parallel) may be used in alternative embodiments. Each of the execution units 135 may be subdivided into portions such as a high portion and a low portion for processing different subsets of the bits in the instructions in the register file 125. The lane crossing stage is configured to modify a mapping of bits from the register file 125 from a default mapping between the register file 125 and subsequent stages.

Figure 2A:
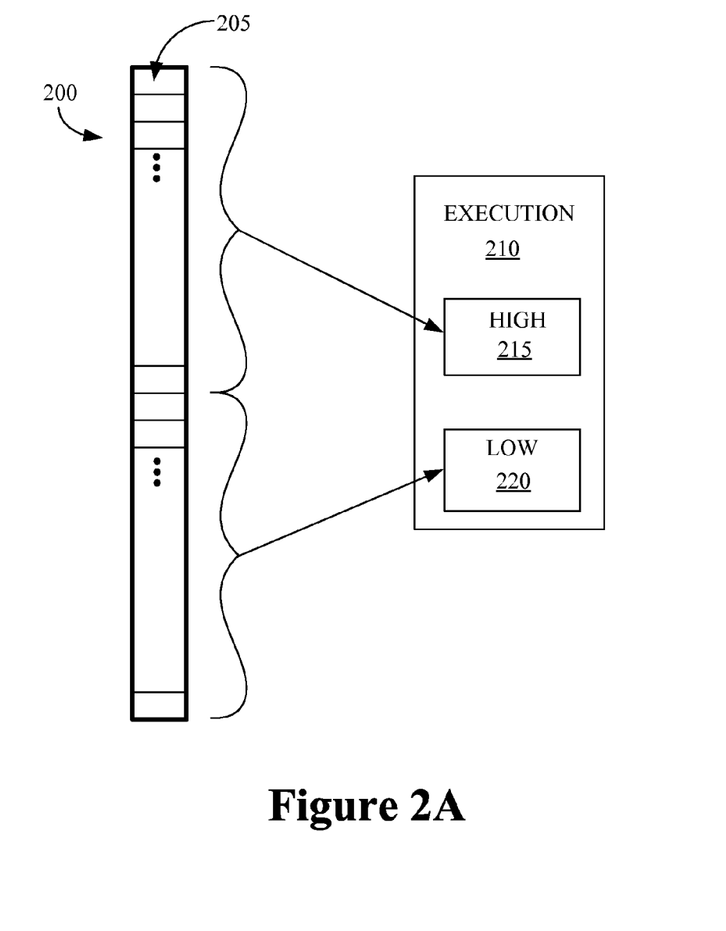
FIGS. 2A and 2B conceptually illustrate first and second exemplary embodiments of a mapping of a register to an execution stage.

FIG. 2A conceptually illustrates a first exemplary embodiment of a mapping of register 200 to execution stage 205. In the illustrated embodiment, the register 200 includes 128 locations 205 (only one indicated by a numeral in FIG. 2A) for storing the bits of a 128-bit operand. However, persons of ordinary skill in the art having benefit of the present disclosure should appreciate that this example is intended to be illustrative and not to limit the structure of the registers 200. In other embodiments, such as embodiments that implement different pipeline architectures that use a different size operand, the size and/or number of registers 200 may differ from the example depicted in FIG. 2A.

In the illustrated embodiment, the most significant bits 210 in the register 200 are mapped to the high portion 215 of the execution stage 205. The high portion 215 can therefore perform the operations indicated by the instruction bits 210 in the most significant bit portion of the instruction/operand stored in the register 200. The least significant bits 210 in the register 200 are mapped to the low portion 220 of the execution stage 205. The low portion 220 can therefore perform the operations indicated by the instruction bits 210 in the least significant bit portion of the instruction/operand stored in the register 200. For example, a 128-bit operand can be divided into two 64-bit portions including the most significant bits and the least significant bits, respectively. The most significant 64 bits can be mapped to the high portion 215 and the least significant 64 bits can be mapped to the low portion 220. In one embodiment, the mapping depicted in FIG. 2A may be the default mapping between the register 200 and the execution stage 205 that may be used for the data path that bypasses the lane crossing stage.

Figure 2B:
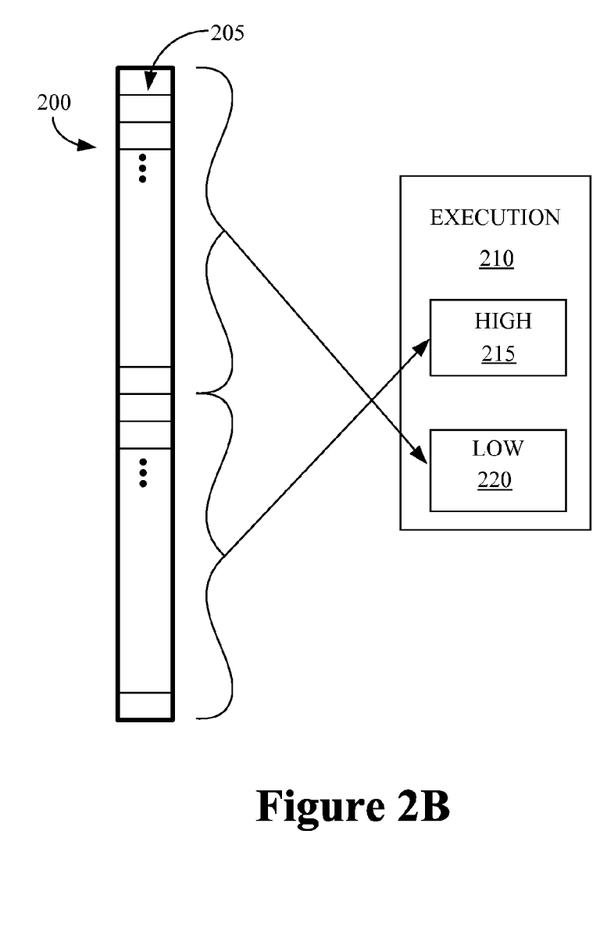

FIG. 2B conceptually illustrates a second exemplary embodiment of a mapping of register 200 to execution stage 205. In the second exemplary embodiment, the most significant bits 210 in the register 200 are mapped to the low portion 220 of the execution stage 210. The low portion 220 can therefore perform the operations indicated by the instruction bits 205 in the most significant bit portion of the instruction/operand stored in the register 200. The least significant bits 205 in the register 200 are mapped to the high portion 215 of the execution stage 210. The high portion 215 can therefore perform the operations indicated by the instruction bits 205 in the least significant bit portion of the instruction/operand stored in the register 200. For example, a 128-bit operand can be divided into two 64-bit portions including the most significant bits and the least significant bits. The least significant 64 bits can be mapped to the high portion 215 and the most significant 64 bits can be mapped to the low portion 220. The mapping depicted in FIG. 2B can be referred to as a lane crossing or swapping type of mapping that may be implemented in the lane crossing stage 120.

Although the lane crossing and/or swapping depicted in FIG. 2B changes the mapping of the register 200 so that the uppermost portion of the register 200 is mapped to the low portion 220 of the execution stage 210 and the lowermost portion of the register 200 is mapped to the high portion 215 of the execution stage 210, persons of ordinary skill in the art having benefit of the present disclosure should appreciate that lane crossing and/or swapping is not limited to this example. In alternative embodiments, different portions of the register 200 can be mapped to the different portions/inputs of the execution stage 210. For example, two 32 bit chunks of data within 64 bits of source operand/instruction may be swapped. For another example, in a two-source instruction, 64 bits of data from one source may be swapped with the other source before proceeding to the execution units 215, 220. Crossing/swapping the source data to the appropriate execution units 215, 220 may put timing pressure on the register file/data bypass network. Scheduling/selecting lane crossing data from the data path that includes the lane crossing stage or data from the data path that bypasses the lane crossing stage can relieve this timing pressure without sacrificing operation execution latency or an optimal operation schedule.

Referring back to FIG. 1A, the lane-crossing stage 130 may use one cycle to perform the lane-crossing operations on the instruction. Bypassing the lane-crossing stage 130 may therefore introduce a conflict in the case of issuing a lane-cross instruction in one cycle and then issuing a non-lane-cross instruction during the next cycle. Both instructions may try to use inputs to the execution stage 135 in the same cycle. In one embodiment, the scheduler queue 110 may not issue non-lane-cross instructions in the next cycle following a cycle in which a lane-cross instruction was issued. The scheduler queue 110 may instead insert a bubble into the instruction schedule if there are no lane-cross instructions that are ready to be issued. The scheduler queue 110 can issue another lane-cross instruction on the next cycle since it should not cause a conflict because the new lane-cross instruction also passes through the lane-cross stage. In one embodiment, the scheduler queue 110 or scheduler control logic 115 may keep a bit per instruction that tracks whether or not each instruction uses the lane-cross stage. These bits (which may be referred to as an op-ready indicator) can be cleared for non-lane-cross instructions in the cycle after a lane-cross instruction has been issued.

In another exemplary embodiment, a single bit of state called "lane cross stage in use" can be utilized by the scheduler control logic 115. For example, the scheduler control logic 115 can use this state bit to select the lane-cross stage 130. For example, the state bit may be set when the scheduler queue 110 issues a lane-cross instruction. If the scheduler queue 110 wants to issue a non-lane-cross instruction in the next cycle, the non-lane-cross instruction can be issued and the scheduler control logic 115 can tell the lane crossing stage 130 to pass through the non-lane cross instruction without modifying the mapping of the register file 125 to the execution stage 125. Embodiments of this technique may avoid the conflict on the inputs to the execution stage 135. When the scheduler queue 110 and/or scheduler control logic 115 detect a "dead" cycle where there are no instructions issued by the scheduler queue 110, the "lane cross stage in use" bit can be cleared. On following cycles, non-lane-cross instructions again bypass the lane cross stage 130 and can be directly input to the execution stage 135. Using the "lane cross stage in use" bit may allow the scheduler queue 110 and/or scheduler control logic 115 to remain fully-pipelined and picking instructions on every cycle without prioritizing lane-cross instructions above non-lane-cross instructions, inserting bubbles, introducing schedule anomalies, and/or adding complexity to the scheduler control logic 115.

Figure 1B:
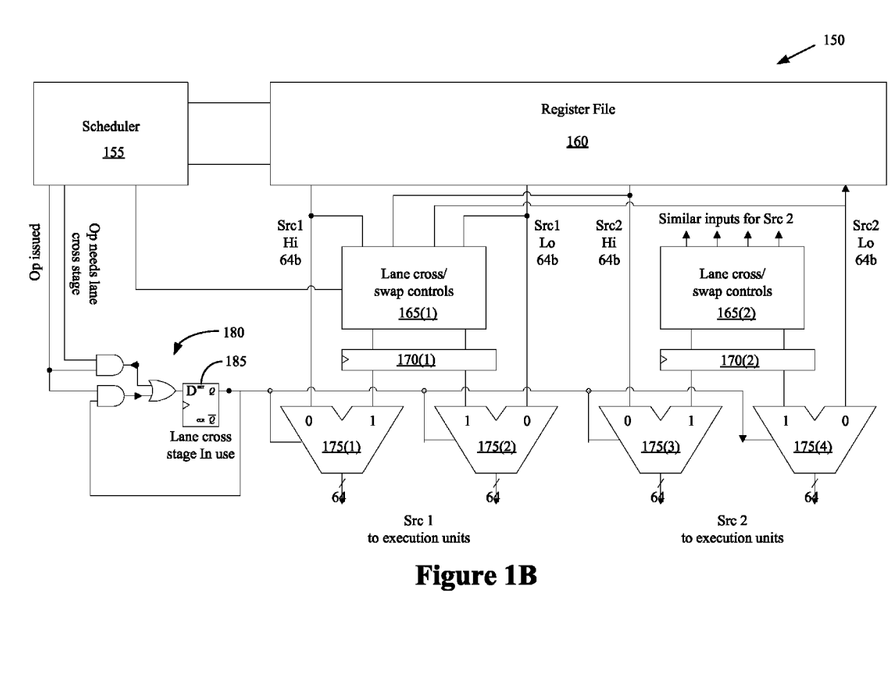

FIG. 1B conceptually illustrates a second exemplary embodiment of a processor system 150. In the illustrated embodiment, the processor system 150 includes a scheduler 155 that is configured to control and coordinate processing of instructions. The scheduler 155 may receive instructions/operands from previous stages in the instruction pipeline and then hold the instructions until they are ready to execute. The structure of this embodiment of the scheduler 155 may permit the processor system 300 to perform out-of-order execution and in some embodiments and/or operational circumstances, there may be many instructions waiting in the scheduler 155 to be issued to the execution stage. If many instructions are ready to be executed, some of which are lane-cross and some of which are not, then the scheduler 155 is capable of selecting and implementing an instruction schedule that improves or optimizes operation of the processor system 300, as discussed herein.

The scheduler 155 can issue instructions to the register file 160. Each issued instruction may be a lane-crossing instruction or a non-lane-crossing instruction. In the illustrated embodiment, each instruction provided to the register file 160 is separated or partitioned into two source operands. For example, a 256 bit instruction can be divided into two source operands that each includes 128 bits. The illustrated embodiment also implements two lane cross units 165 so that the two source operands can be operated on in parallel and concurrently. However, persons of ordinary skill in the art having benefit of the present disclosure should appreciate that alternative architectures may partition instructions into different numbers of operands and may use different numbers of lane cross units. The register file 160 transmits the bits for each source operand along a first data path from the register file 160 to the lane cross units 165. In the illustrated embodiment, the first data path includes pathways to both lane cross units 165 and each of these pathways is partitioned into one path for the low 64 bits of each source operand and another data path for the high 64 bits of each source operand. The register file 160 also transmits copies of the bits for each source operand along a second data path from the register file 160 to multiplexers 175. The second data path bypasses the lane cross units 165. In the illustrated embodiment, the second data path that bypasses the lane cross units 165 is provided to the "0" input of the multiplexers 175.

The lane cross units 165 are configured to modify the mapping of data bits from the register file 160, e.g., by swapping portions of the instructions and/or operands as discussed herein. The re-mapped data bits are then provided to flip-flops or registers 170 for storage between pipelined cycles. The registers 170 are coupled to the multiplexers 175 so that the re-mapped data bits can be selected for output from the multiplexer 175. In the illustrated embodiment, the data bits that travel along the first data path through the lane cross units 165 is provided to the "1" input of the multiplexers 175.

The scheduler 155 can determine whether each instruction is a lane-crossing instruction or a non-lane crossing instruction and then control operation of the multiplexers 175 accordingly. In the illustrated embodiment, the scheduler 155 provides a first signal indicating that an instruction has been issued (Op Issued) and a second signal indicating whether the instruction is to be provided to the lane crossing unit 165 or should bypass the lane crossing unit 165 (Op Needs Lane Cross Stage). These signals are provided to control circuitry 180. In the illustrated embodiment, the control circuitry 180 includes a flip flop 185 for storing a bit that is used to indicate that the lane cross stage is in use. As discussed herein, the scheduler 155 can use this state bit 185 to select the lane-cross stage 165. For example, in one embodiment, if the scheduler 155 wants to issue a non-lane-cross instruction in the next cycle and the state bit 185 is set, the non-lane-cross instruction can be issued and the scheduler 155 can tell the lane crossing stage 165 to pass through the non-lane cross instruction without modifying the mapping of the register file 160 to the execution stage.

In alternative embodiments, the scheduler 155 may implement different rules or algorithms for deciding when to issue lane-cross instructions and non-lane-cross instructions. For example, conflicts typically do not arise when a sequence of the same type of instruction is issued by the scheduler 155. However, if a lane-cross instruction is selected out of the set of ready-to-execute instructions, then subsequent non-lane-cross instructions may conflict or collide with the lane-cross instructions at the execution stage. In one embodiment, the scheduler 155 may elect not to issue an instruction following the lane-cross instruction and instead insert a bubble into the pipeline. In another embodiment, the scheduler 155 may pick only lane-cross instructions out of the set of ready-to-execute instructions following issuance of a lane-cross instruction since lane-cross instructions avoid the conflict on the execution unit inputs. In yet another embodiment, the scheduler 155 may use the lane-cross-in-use state bit to control operation of the lane cross stage 165 (as discussed herein). In this embodiment, the scheduler 155 can issue any type of instruction.

FIGS. 3A-D conceptually illustrate four exemplary embodiments of a timing diagram used in the pipeline architecture. In the illustrated embodiment, each instruction is executed in two execution cycles. However, persons of ordinary skill in the art having benefit of the present disclosure should appreciate that this embodiment is intended to be illustrative and alternative embodiments may use different numbers of execution cycles to execute the instructions. The horizontal axis indicates the pipelining stage: register file read (RR), lane crossing (LC), first execution cycle (EX1), and second execution cycle (EX2). The vertical axis indicates the operational cycle of the pipelining stage increasing downwards. Individual instructions are queued by a scheduler that issues selected instructions to the RR stage. In the illustrated embodiment, the instructions 1, 3, 5 are lane-crossing instructions and instructions 2, 4, and 6 are non-lane-crossing instructions. The instructions 7-9 are non-lane-crossing instructions. The optimal completion order for the instructions in each set is 1, 2, 3, 4, 5, 6 and 7, 8, 9. In one embodiment, the first and second sequences 300, 305 can be performed concurrently using parallel data processing pipelines.

Figure 3A:
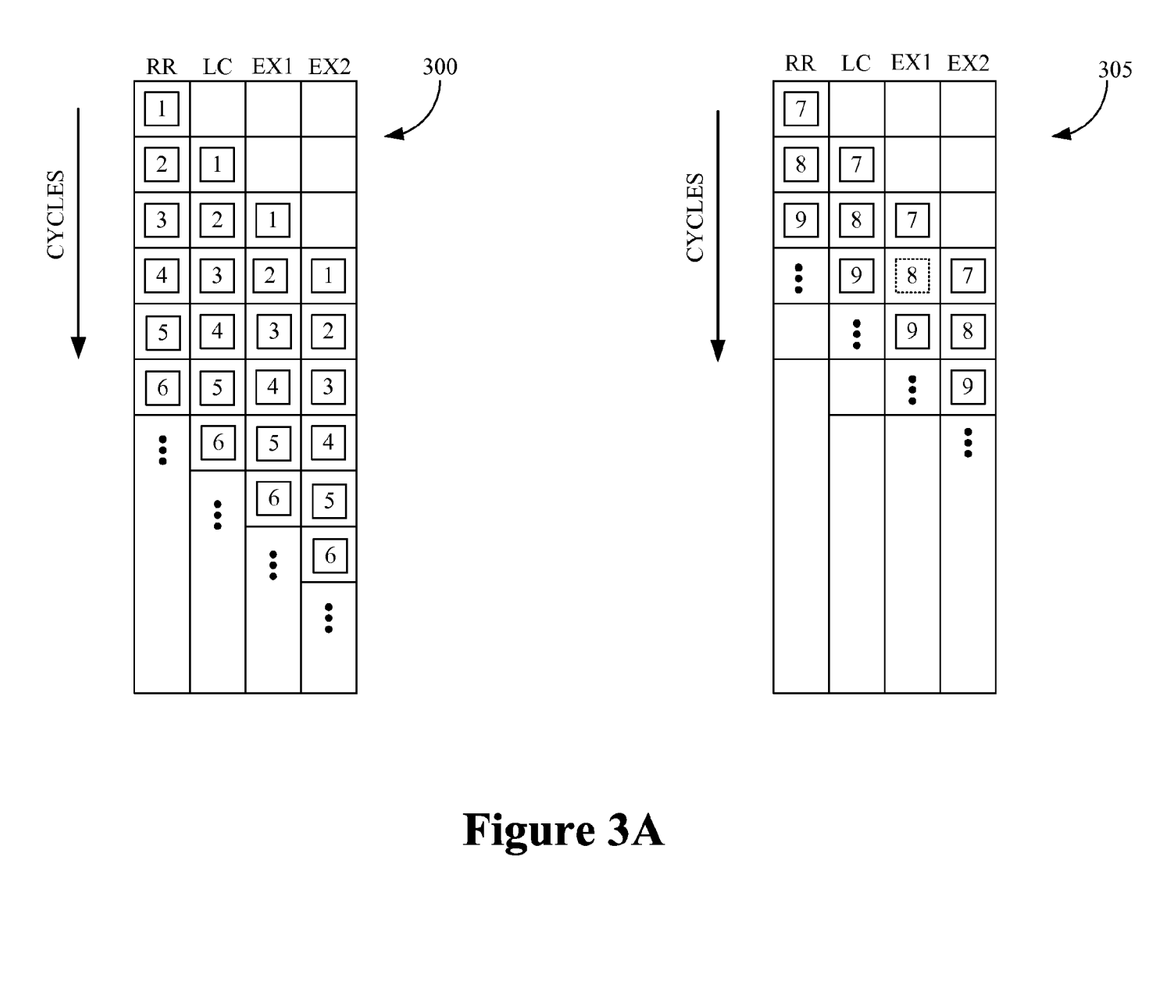
FIGS. 3A-D conceptually illustrate four exemplary embodiments of a timing diagram used in the pipeline architecture.

In the first exemplary embodiment, additional stages are added so that all of the instructions are processed in the lane crossing stage. For example, the lane crossing stage can perform the lane crossing and/or swapping for the lane-crossing instructions and can simply delay the non-lane-crossing instructions for one cycle. The throughput for the first sequence 300 in this embodiment is one completed instruction/operand per cycle in the execution latency is 4 cycles. The throughput and execution latency for the second sequence 305 are the same as the throughput and execution latency for the first sequence 300.

Figure 3B:
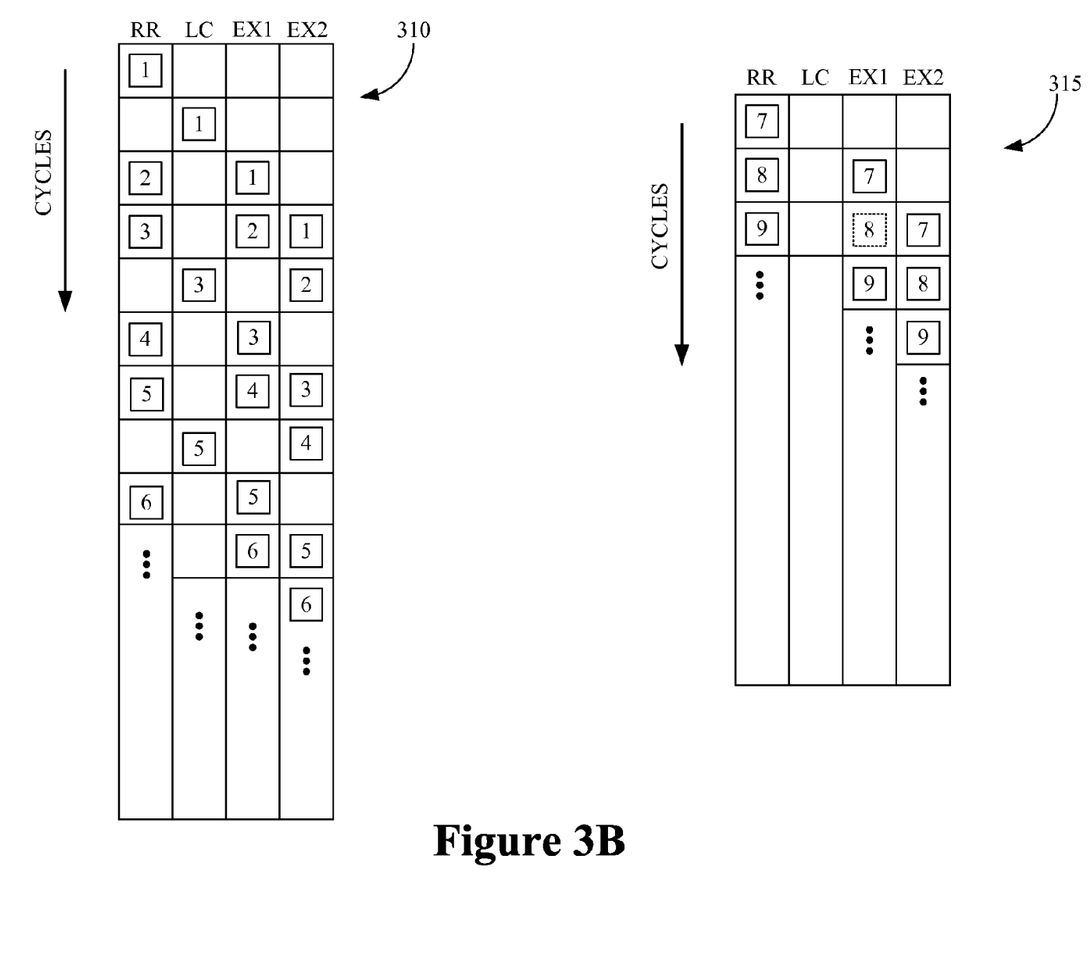

In the second exemplary embodiment, the scheduler can instruct non-lane-crossing instructions to bypass the lane-crossing stage. The scheduler can insert bubbles when it detects potential conflict between the first and second instructions. This conflict may occur because the second instruction is a non-lane-crossing instruction that bypasses the lane-crossing stage and so the first and second instructions may reach the execution stage during the same cycle. For example, the scheduler issues a first instruction in the first cycle. The first instruction is a lane-crossing instruction. In the second cycle, the scheduler inserts a bubble to avoid the potential conflict between the first and second instructions. The scheduler may then issue a second instruction in the third cycle. The second instruction is a non-lane crossing instruction. Inserting the bubble allows the first and second instructions to arrive at the execution stages in successive cycles, thereby avoiding the conflict. The latency for the first sequence 310 in the second exemplary embodiment is 4 cycles for lane—crossing instructions and 3 cycles for non-lane-crossing instructions. The latency for the second sequence 315 is 3 cycles since all of these instructions are non-lane-crossing instructions that bypass the lane crossing stage. The throughput for the second sequence 315 is also one instruction per cycle, but the sequence 310 does not complete one instruction every cycle and so the throughput for sequence 310 is lower.

Figure 3C:
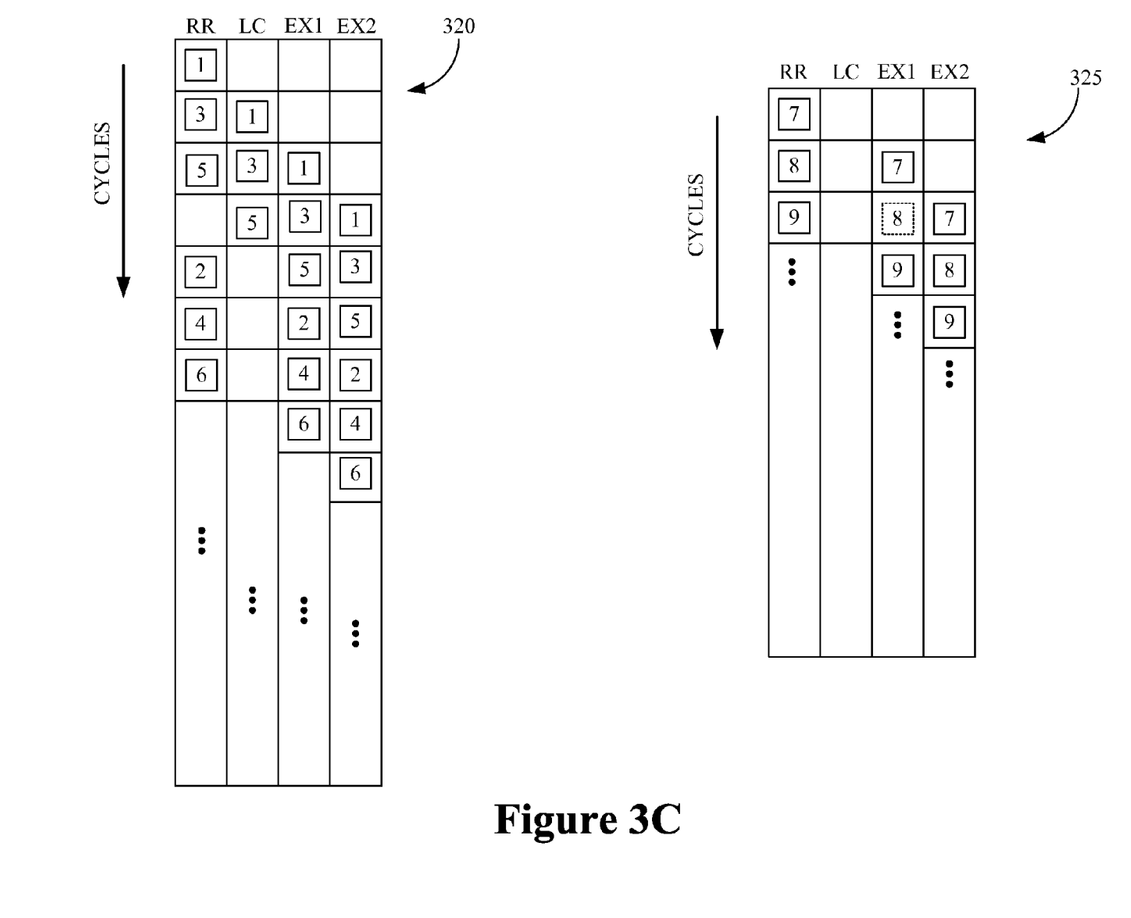

In the third exemplary embodiment, the scheduler instructs non-lane-crossing instructions to bypass the lane crossing stage. The scheduler avoids conflicts between lane-crossing instructions and non-lane-crossing instructions by issuing only lane-crossing instructions on consecutive cycles that follow a cycle in which the scheduler issued a lane-crossing instruction. The scheduler resumes issuing non-lane-crossing instructions following dead cycles. Thus, in the third exemplary embodiment, instructions 1, 3, 5 in sequence 320 are all issued and processed prior to issuing instructions 2, 4, 6. The latency of the sequence 320 is 4 cycles and one instruction is completed per cycle. However, the instructions may be executed in a sub-optimal order because lane-crossing instructions are prioritized over non-lane crossing instructions. The latency for the second sequence 325 is 3 cycles and the throughput is one instruction per cycle.

Figure 3D:
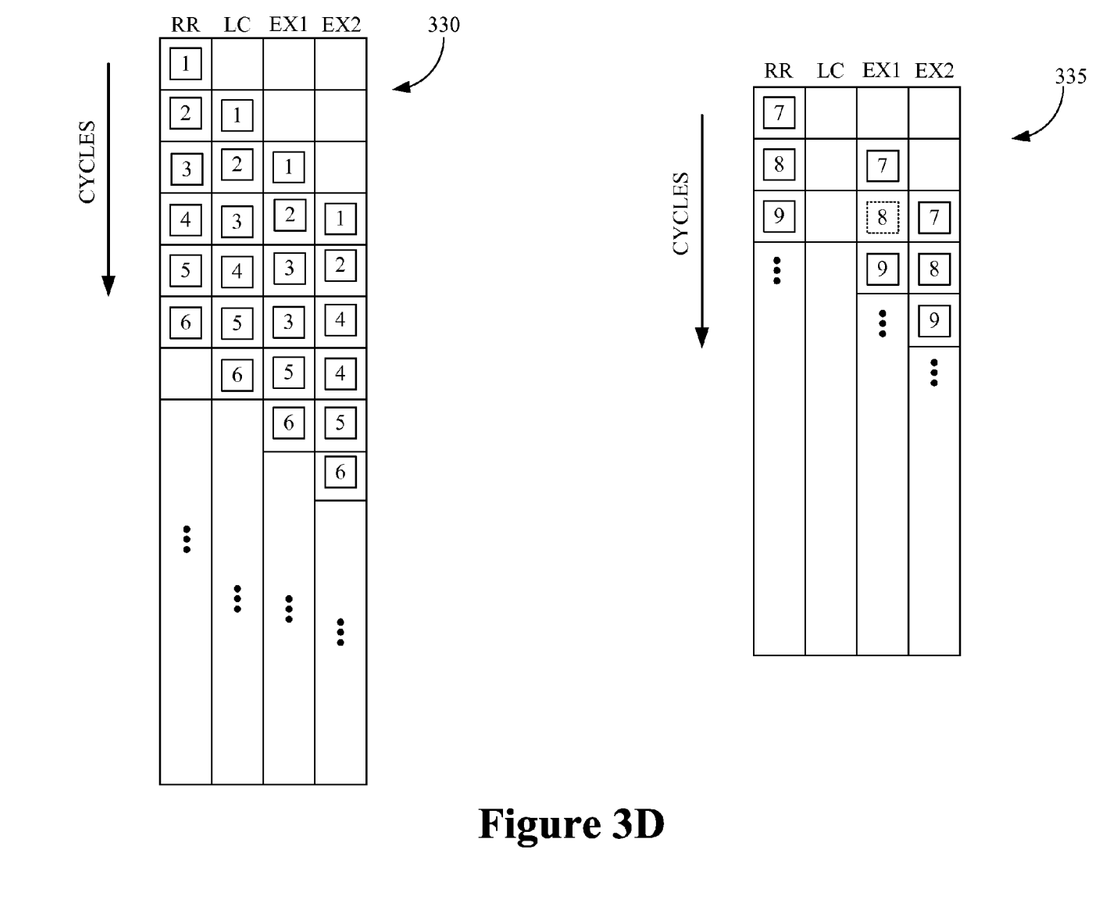

In the fourth exemplary embodiment, the scheduler instructs non-lane-crossing instructions to bypass the lane crossing stage. The scheduler avoids conflicts between lane-crossing instructions and non-lane-crossing instructions by instructing non-lane-crossing instructions to bypass the lane crossing stage until a lane-crossing instruction is issued. Non-lane-crossing instructions that are issued in the subsequent cycles are instructed to pass through the lane-crossing-stage. The scheduler also instructs the lane crossing stage to maintain the default mapping so that no modification or re-mapping is performed on the non-lane-crossing instruction in the lane crossing stage. The latency of the sequence 330 is 4 cycles, one instruction is completed per cycle, and the instructions are executed in the optimal order. The latency for the second sequence 335 is 3 cycles and the throughput is one instruction per cycle.

Figure 4:
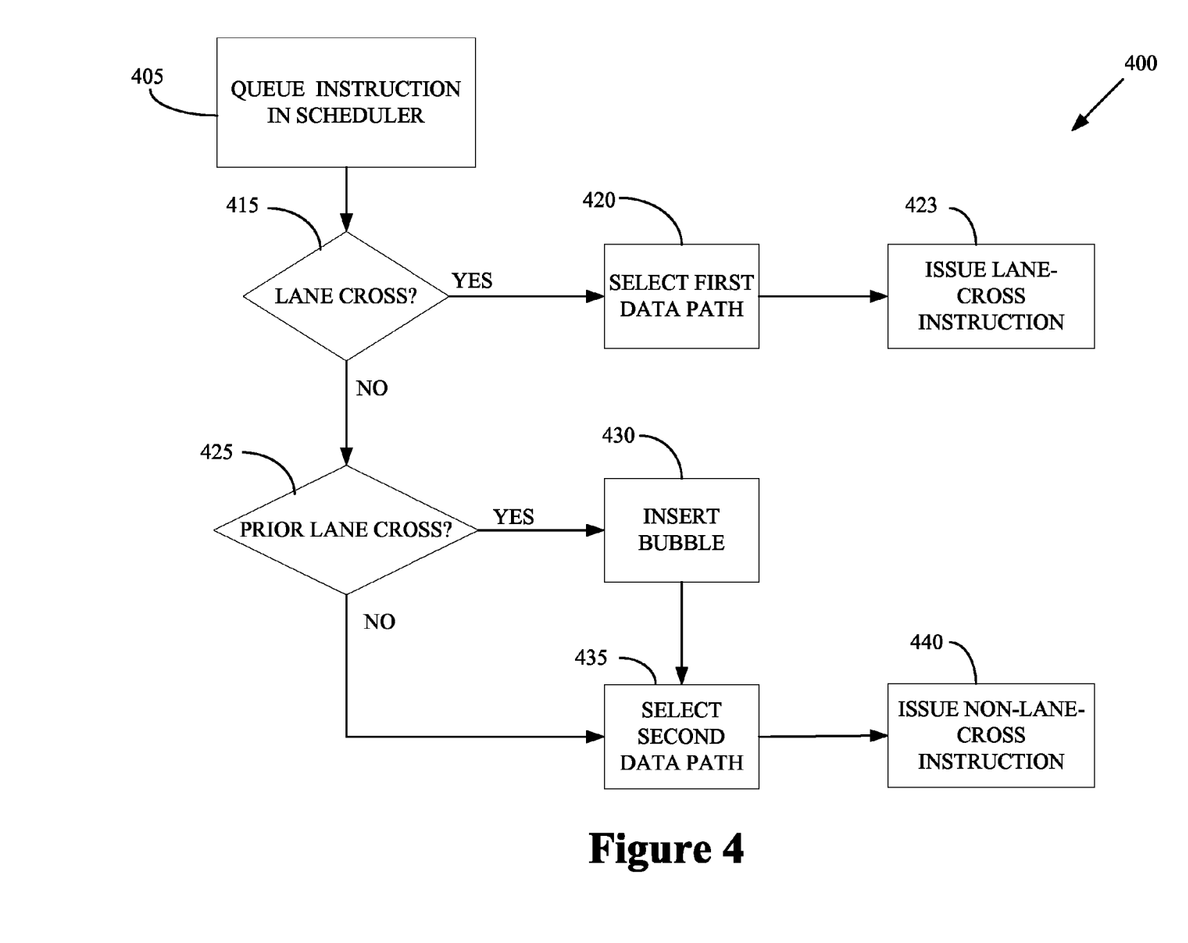
FIG. 4 conceptually illustrates one exemplary embodiment of a method of scheduling instructions in a pipelined architecture.

FIG. 4 conceptually illustrates one exemplary embodiment of a method 400 of scheduling instructions in a pipelined architecture. In the illustrated embodiment, one or more instructions are queued (at 405) by a scheduler. The scheduler determines (at 415) whether the next ready-to-execute instruction in the queue is a lane-crossing instruction or a non-lane-crossing instruction. If the instruction is a lane-crossing instruction, the scheduler selects (at 420) the first data path that includes the lane-crossing stage (e.g., using a multiplexer) so that the data from the registers passes through the lane-crossing stage before being provided to the execution stage. The scheduler can then issue (at 423) the lane-crossing instruction for processing along the first data path. If the instruction is a non-lane-crossing instruction, then the scheduler determines (at 425) whether the previous instruction in the pipeline was a lane-crossing instruction or not. The scheduler inserts (at 430) a bubble in the pipeline before processing the next instruction when the previous instruction was a lane-crossing instruction. Otherwise, no bubble may be inserted in the pipeline. The scheduler selects (at 435) the second data path so that the non-lane-crossing instruction is provided to the execution stage at the appropriate cycle and then issues (at 440) the non-lane-crossing instruction in the current cycle or in the cycle following the bubble.

Figure 5:
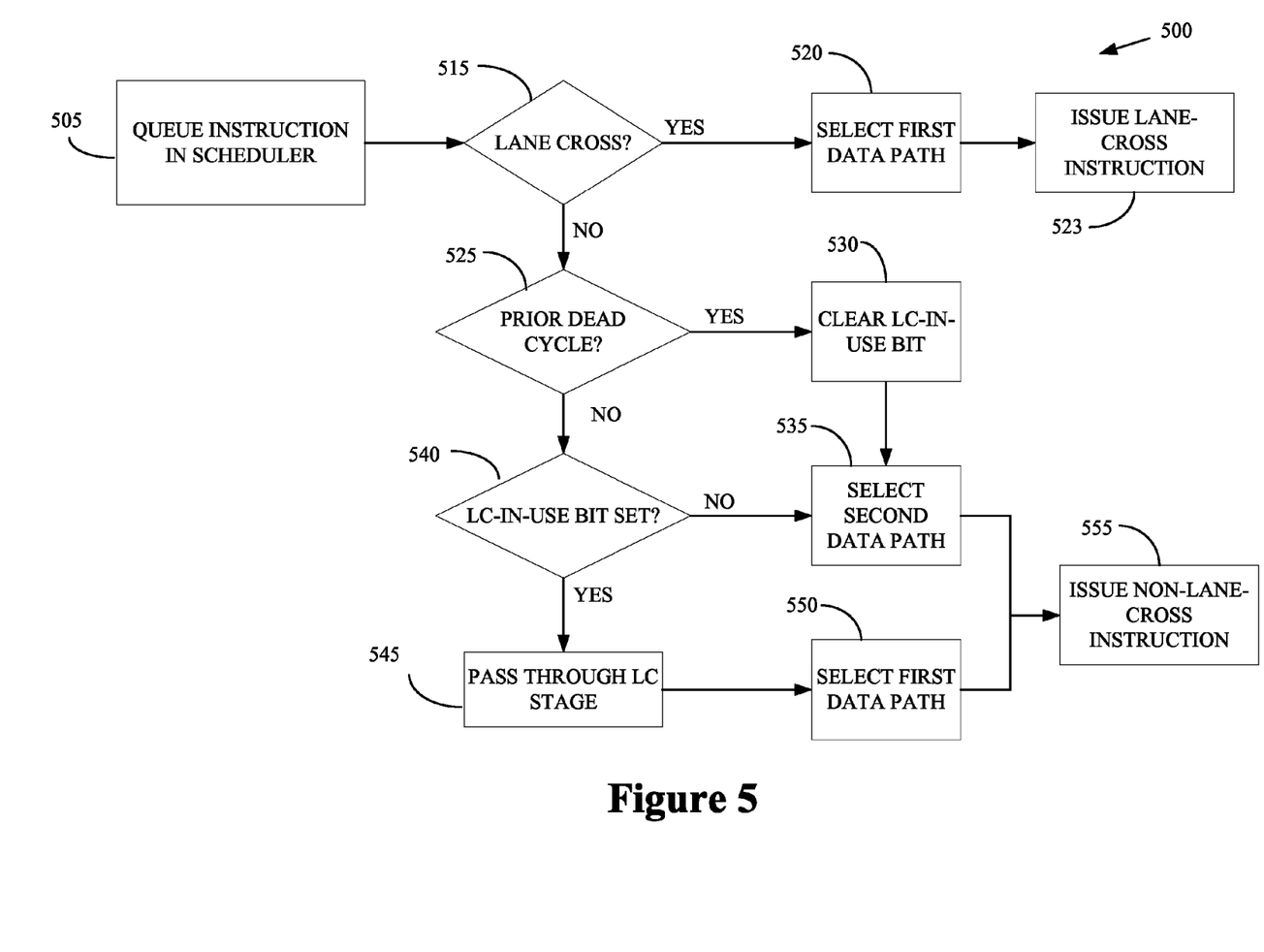
FIG. 5 conceptually illustrates another exemplary embodiment of a method of scheduling instructions in a pipelined architecture.

FIG. 5 conceptually illustrates another exemplary embodiment of a method 500 of scheduling instructions in a pipelined architecture. In the illustrated embodiment, one or more instructions are queued (at 505) by a scheduler. The scheduler determines (at 515) whether the instruction is a lane-crossing instruction or a non-lane-crossing instruction. If the instruction is a lane-crossing instruction, the scheduler selects (at 520) the first data path that includes the lane-crossing stage (e.g., using a multiplexer) so that the data from the registers passes through the lane-crossing stage before being provided to the execution stage. The scheduler can then issue (at 523) the lane-cross instruction.

If the instruction is a non-lane-crossing instruction, the scheduler determines (at 525) whether the previous cycle included a dead cycle in which the lane-crossing stage was idle. If the previous cycle was a dead cycle, then the non-lane-crossing instruction can bypass the lane-crossing stage by being routed along the second data path. The scheduler can clear (at 530) the lane-crossing in-use bit and select (at 535) the second data path to provide the non-lane-crossing instruction to the execution stage. If the previous cycle was not a dead cycle, the scheduler determines (at 540) whether the lane-crossing-in-use bit is currently set. If this bit is not set, then the non-lane-crossing instruction can bypass the lane-crossing stage and the scheduler may select (at 535) the second data path. If this bit is set, the scheduler can instruct (at 545) the lane crossing stage to pass-through the non-lane-crossing instruction without modifying its mapping to the execution stage. The first data path may then be selected (at 550) to provide the non-lane-crossing instruction to the execution stage. The scheduler can then issue (at 555) the non-lane-cross instruction in the appropriate cycle.

Embodiments of processor systems that can handle lane crossing instructions as described herein (such as the processor system 100) can be fabricated in semiconductor fabrication facilities according to various processor designs. In one embodiment, a processor design can be represented as code stored on a computer readable media. Exemplary codes that may be used to define and/or represent the processor design may include HDL, Verilog, and the like. The code may be written by engineers, synthesized by other processing devices, and used to generate an intermediate representation of the processor design, e.g., netlists, GDSII data and the like. The intermediate representation can be stored on computer readable media and used to configure and control a manufacturing/fabrication process that is performed in a semiconductor fabrication facility. The semiconductor fabrication facility may include processing tools for performing deposition, photolithography, etching, polishing/planarizing, metrology, and other processes that are used to form transistors and other circuitry on semiconductor substrates. The processing tools can be configured and are operated using the intermediate representation, e.g., through the use of mask works generated from GDSII data.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method, comprising:
   conveying bits of an instruction from a register to an execution stage in a pipeline along a first data path that includes a lane crossing stage configured to change a first mapping of the register to the execution stage to a second mapping;
   concurrently conveying the bits along a second data path from the register to the execution stage that bypasses the lane crossing stage; and
   selecting by a multiplexer in response to a signal from a scheduler, the first or second data path to provide the bits to the execution stage.

2. The method of claim 1, wherein conveying the bits along the first data path comprises conveying the bits from the register to the lane crossing stage during a first cycle, and wherein the lane crossing stage is configured to provide the bits to a multiplexer for provision to the execution stage during a second cycle subsequent to the first cycle.

3. The method of claim 2, wherein conveying the bits along the second data path comprises conveying the bits from the register to the multiplexer for provision to the execution stage during the first cycle.

4. The method of claim 3, wherein the instruction is either a lane-crossing instruction that uses the second mapping or a non-lane-crossing instruction that uses the first mapping.

5. The method of claim 4, wherein selecting the first or second data path comprises selecting the first or second data paths so that the bits of a non-lane-crossing instruction are provided to the execution stage according to the first mapping during the first cycle or bits of a lane-crossing instruction are provided to the execution stage according to the second mapping during the second cycle.

6. The method of claim 4, wherein conveying bits of a non-lane-crossing instruction comprises delaying the non-lane-crossing instruction by a cycle when bits of a lane-crossing instruction were conveyed during the previous cycle.

7. The method of claim 6, wherein conveying bits of the lane-crossing instruction comprises conveying bits of the lane-crossing instruction instead of an available non-lane-crossing instruction when bits of a lane-crossing instruction were conveyed during the previous cycle.

8. The method of claim 6, comprising inserting a bubble when no lane-crossing instruction is available when bits of a lane-crossing instruction were conveyed during the previous cycle.

9. The method of claim 4, wherein conveying bits of a non-lane-crossing instruction comprises conveying the bits of the non-lane-crossing instruction to the lane crossing stage during the first cycle and instructing the lane crossing stage to provide the bits to the execution stage during the second cycle using the first mapping.

10. The method of claim 9, wherein selecting the first or second data path comprises selecting the first data path so that the bits are provided to the execution stage according to the first mapping during the second cycle.

11. An apparatus, comprising:
    means for conveying bits of an instruction from a register to an execution stage in a pipeline along a first data path that includes a lane crossing stage configured to change a first mapping of the register to the execution stage to a second mapping;
    means for concurrently conveying the bits along a second data path from the register to the execution stage that bypasses the lane crossing stage; and
    means for selecting in response to a signal from a scheduler the first or second data path to provide the bits to the execution stage.

12. An apparatus, comprising:
    a lane crossing stage configured to receive bits of an instruction from at least one register and convey the bits to an execution stage in a pipeline along a first data path, the lane crossing stage being further configured to change a first mapping of the register to the execution stage to a second mapping; and
    a multiplexer configured to, in response to a signal from a scheduler, selectively provide the bits from the lane crossing stage according to the second mapping or to provide the bits received along a second data path from the register to the execution stage that bypasses the lane crossing stage.

13. The apparatus of claim 12, comprising said at least one register for storing the bits of the instruction and conveying the bits along the first data path and the second data path.

14. The apparatus of claim 13, comprising a scheduler configured to cause the bits to be conveyed from said at least one register to the lane crossing stage along the first data path during a first cycle, and to cause the lane crossing stage to provide the bits to the multiplexer for provision to the execution stage during a second cycle subsequent to the first cycle.

15. The apparatus of claim 14, wherein the scheduler is configured to cause the bits to be conveyed along the second data path from the register to the multiplexer for provision to the execution stage during the first cycle.

16. The apparatus of claim 15, wherein the instruction is either a lane-crossing instruction that uses the second mapping or a non-lane-crossing instruction that uses the first mapping.

17. The apparatus of claim 16, wherein the scheduler is configured to provide a signal to the multiplexer to select the first or second data paths so that the bits of a non-lane-crossing instruction are provided to the execution stage according to the first mapping during the first cycle or bits of a lane-crossing instruction are provided to the execution stage according to the second mapping during the second cycle.

18. The apparatus of claim 16, comprising at least one first bit that can be polled by the scheduler to determine whether to cause at least one of:
    delaying the non-lane-crossing instruction by a cycle when bits of a lane-crossing instruction were conveyed during the previous cycle;
    conveying bits of the lane-crossing instruction instead of an available non-lane-crossing instruction when bits of a lane-crossing instruction were conveyed during the previous cycle; or
    inserting a bubble when no lane-crossing instruction is available when bits of a lane-crossing instruction were conveyed during the previous cycle.

19. The apparatus of claim 16, comprising at least one second bits that can be polled by the scheduler to determine whether to cause at least one of:

conveying the bits of the non-lane-crossing instruction to the lane crossing stage during the first cycle and instructing the lane crossing stage to provide the bits to the execution stage during the second cycle using the first mapping; or selecting the first data path so that the bits are provided to the execution stage according to the first mapping during the second cycle.

20. A pipelined processor system, comprising:

an instruction decode stage for decoding bits of an instruction;

a register for storing the decoded bits of the instruction;

a lane crossing stage configured to change a first mapping of the register to a second mapping; and an execution stage for, in response to a signal from a scheduler, selectively executing the instruction according to the second mapping using bits received from the lane crossing stage or according to the first mapping using bits that bypass the lane crossing stage.

21. A computer readable medium having encoded instructions thereon that when executed cause a processor system to:

convey bits of an instruction from a register to an execution stage in a pipeline along a first data path that includes a lane crossing stage configured to change a first mapping of the register to the execution stage to a second mapping;

concurrently convey the bits along a second data path from the register to the execution stage that bypasses the lane crossing stage; and select, in response to a signal from a scheduler, the first or second data path to provide the bits to the execution stage.

22. The computer readable medium set forth in claim 21, wherein the instruction is either a lane-crossing instruction that uses the second mapping or a non-lane-crossing instruction that uses the first mapping, and wherein the encoded instructions when executed cause the processor system to select the first or second data paths so that the bits of a non-lane-crossing instruction are provided to the execution stage according to the first mapping during the first cycle or bits of a lane-crossing instruction are provided to the execution stage according to the second mapping during the second cycle.

23. The computer readable medium set forth in claim 22, wherein the encoded instructions when executed cause a processor system to poll at least one first bit to determine whether to cause at least one of:

delaying the non-lane-crossing instruction by a cycle when bits of a lane-crossing instruction were conveyed during the previous cycle;

conveying bits of the lane-crossing instruction instead of an available non-lane-crossing instruction when bits of a lane-crossing instruction were conveyed during the previous cycle; or inserting a bubble when no lane-crossing instruction is available when bits of a lane-crossing instruction were conveyed during the previous cycle.

24. The computer readable medium set forth in claim 22, wherein the encoded instructions when executed cause a processor system to poll at least one second bit to determine whether to cause at least one of:

conveying the bits of the non-lane-crossing instruction to the lane crossing stage during the first cycle and instructing the lane crossing stage to provide the bits to the execution stage during the second cycle using the first mapping; or selecting the first data path so that the bits are provided to the execution stage according to the first mapping during the second cycle.

\* \* \* \* \*